J. M. THOMPSON.
CONDENSER.
APPLICATION FILED OCT. 21, 1907.
999,418.
Patented Aug. 1, 1911.
2 SHEETS—SHEET 1.
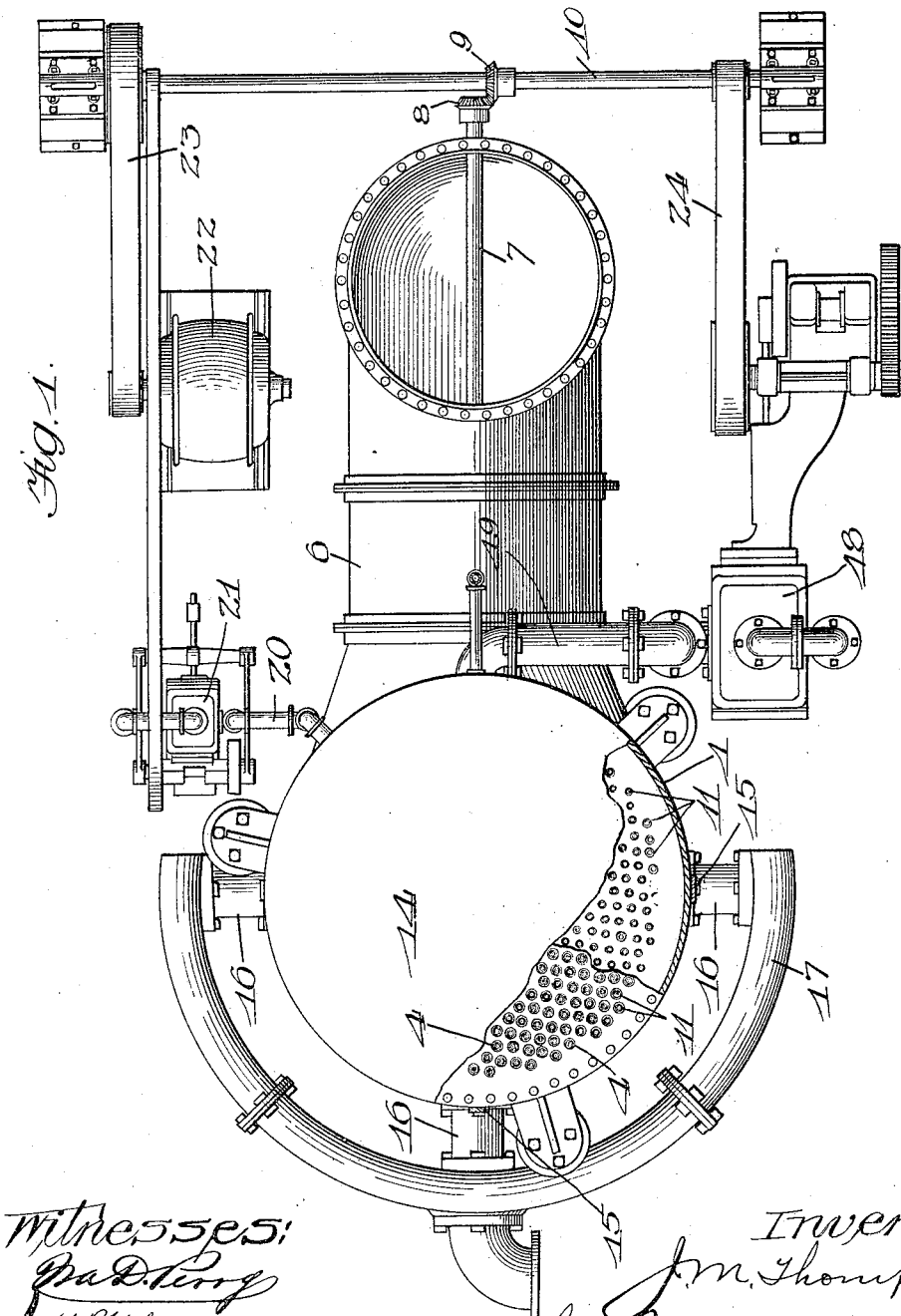

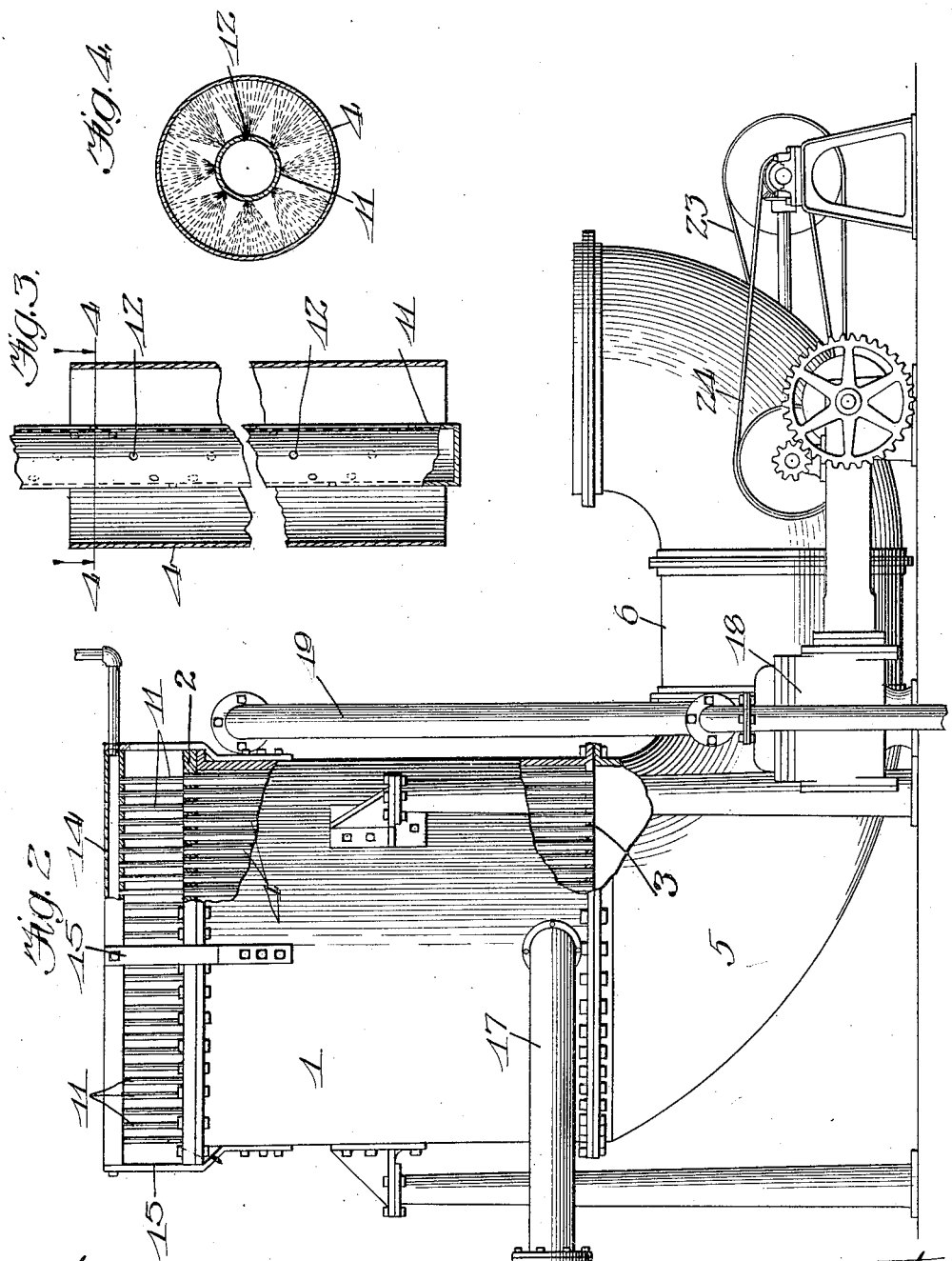

UNITED STATES PATENT OFFICE.

JESSE M. THOMPSON, OF CHICAGO, ILLINOIS.

CONDENSER.

999,418. Specification of Letters Patent. Patented Aug. 1, 1911.

Application filed October 21, 1907. Serial No. 398,419.

*To all whom it may concern:*

Be it known that I, JESSE M. THOMPSON, a citizen of the United States, residing at Chicago, in the county of Cook and State of Illinois, have invented certain new and useful Improvements in Condensers, of which the following is a full, clear, and exact specification.

This invention relates more particularly to that class of surface condensers in which the condensing action is dependent upon the rapid evaporation of a volatile liquid, such as water, on one side of a surface, against whose other side impinges the steam or other fluid to be condensed, and the invention has for its primary object to provide improved, simple and efficient means whereby the entire available surface of the condenser may be supplied uniformly throughout with the requisite amount of water in the presence of a swiftly moving current of air for promoting the evaporation of the water and carrying away the heat absorbed thereby.

With a view to the attainment of these ends and the accomplishment of other objects which will hereinafter appear, the invention consists in the features of novelty which will now be described with reference to the accompanying drawings, and more particularly pointed out in the claim.

In the said drawings—Figure 1 is a plan view, partly in horizontal section, of a condenser embodying this invention. Fig. 2 is a side elevation thereof, partly broken away. Fig. 3 is an enlarged longitudinal sectional view of one of the air tubes, showing also the water tube. Fig. 4 is a cross-section thereof on the line 4—4, Fig. 3.

1 is a shell, which may be of any suitable form, but preferably of upright, cylindrical form, which is provided at its upper and lower ends with heads 2, 3, and in these heads are expanded or otherwise secured a multiplicity of upright tubes 4, constituting air passages open to the atmosphere at their upper ends, and at their lower ends discharging into a neck or elbow 5, which has communication with the casing 6 of a fan or exhauster driven in the proper direction by shaft 7 and gears 8, 9, from a driving shaft 10, for causing a partial vacuum in the tubes 4 and inducing strong downward currents of air therethrough. Disposed centrally in each of these tubes 4 is a small water pipe 11 which is closed to the air and is provided with a multiplicity of fine jet orifices or perforations 12 throughout the entire length and arranged around the body of the tube 4. The lower ends of these pipes 11 are closed to prevent the water from discharging therefrom excepting through the jet orifices 12, while their upper ends are expanded in or otherwise connected with a source of water supply, such, for example, as a shallow header 14 arranged some distance above the upper ends of the tubes 4 so as to allow the free entrance of air to the latter, and having communication with any suitable source of supply. This header is also closed to the atmosphere and is shown in the drawing as being supported upon the shell 1 by standards 15, and it will of course be understood that the pipes 11 are also supported in the tubes 4 by these standards.

The steam or other fluid to be cooled or condensed is admitted to the shell 1 by one or more pipes 16 communicating with a manifold 17, and preferably entering the shell at the lower end thereof, so that the hottest point in the condenser will be near the lower ends of the tubes 4, where the water supply by the pipes 11 will be most profuse, owing to the accumulation thereof against the walls of the tubes and its eventual gravitation toward the lower end. The size of the perforations 12 and their number in each of the pipes 11 should be so proportioned or regulated with respect to the internal heat of the shell 1 and its evaporative power on the wall of the tube that, while the quantity should not be so profuse as to keep the interior of the tube cool and thereby arrest evaporation, it should be sufficient for the energetic generation of steam or vapor, upon the heat absorbing power of which the apparatus depends for its condensing action.

In condensers of this type it is desirable to provide means of drawing off or conducting away the air which enters the condenser shell with the steam, and I have therefore shown an air pump 18 connected with the upper part of the shell by a pipe 19. The water of condensation may be pumped out of the bottom of the shell 1, or allowed to run off through a discharge pipe 20, in this example of the invention the same being connected with the inlet side of a suitable pump 21. This pump may be operated by a motor 22, and the same motor may be utilized for driving the shaft 10 through a suitable operative connection or belt 23. The air pump 18 may also be driven from the shaft 10 by belt 24. Such details, however, are not important.

Having thus described my invention, what I claim as new and desire to secure by Letters Patent is:

In a condenser, the combination of a shell adapted to receive the steam or fluid to be condensed, a multiplicity of vertical tubes arranged in said shell and having both ends open, pipes of smaller diameter than said tubes arranged centrally therein respectively and having jet orifices extending through the length of the tubes, means for supplying said pipes with a volatile liquid shut off from the air to be sprayed within the tubes, and means for exhausting the air from the lower ends of the tubes whereby a partial vacuum will be created within the tubes.

In testimony whereof I have signed my name to this specification, in the presence of two subscribing witnesses, on this 14th day of October, A. D. 1907.

JESSE M. THOMPSON.

Witnesses:
CHARLES H. SEEM,
HARRIET M. TELLER.

Copies of this patent may be obtained for five cents each, by addressing the "Commissioner of Patents, Washington, D. C."